Oct. 13, 1936.  A. L. KRONQUEST  2,057,037
MACHINE FOR APPLYING GLASS PANELS TO CAN ENDS
Filed June 22, 1935   5 Sheets-Sheet 1
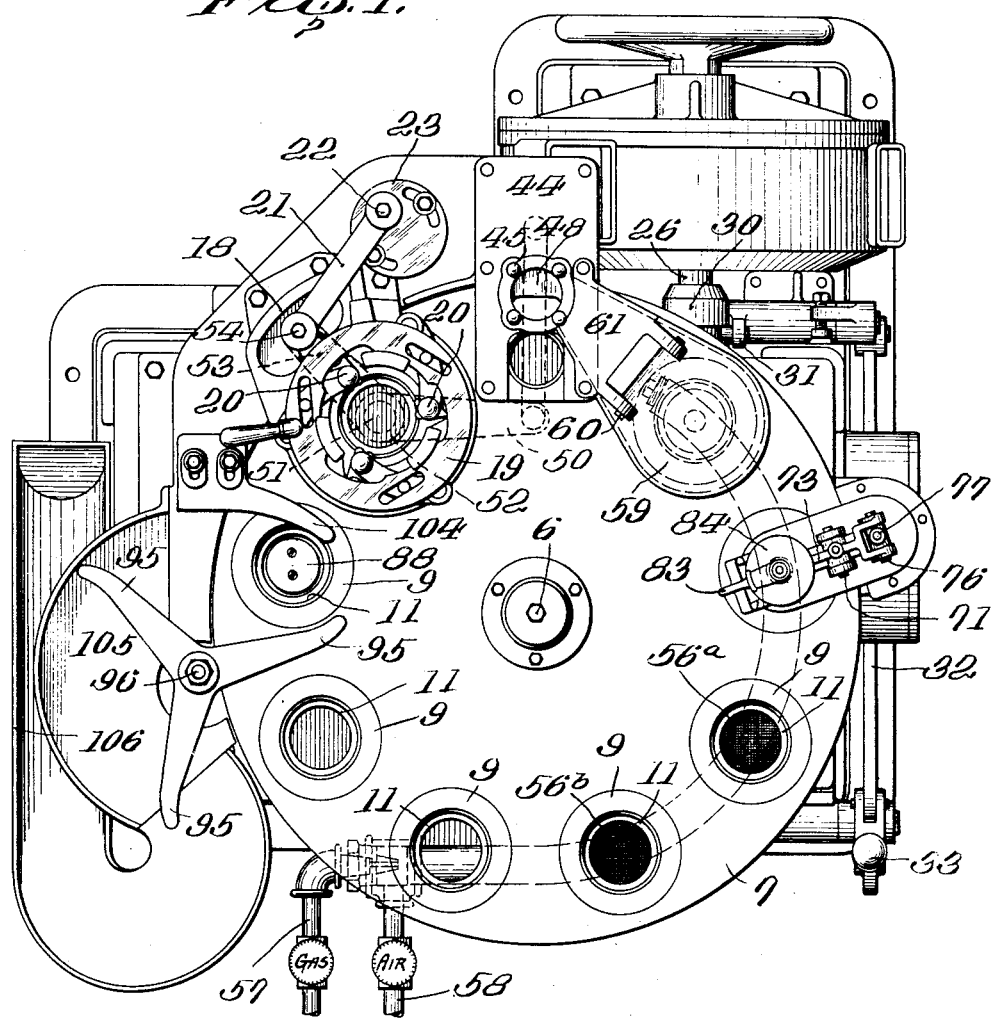
INVENTOR.
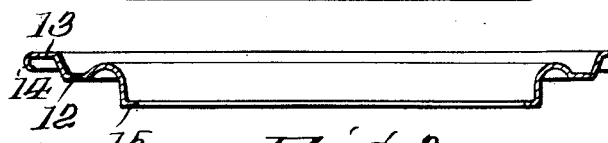
Alfred L. Kronquest
BY Mason & Porter
ATTORNEYS Oct. 13, 1936.  A. L. KRONQUEST  2,057,037
MACHINE FOR APPLYING GLASS PANELS TO CAN ENDS
Filed June 22, 1935  5 Sheets-Sheet 2
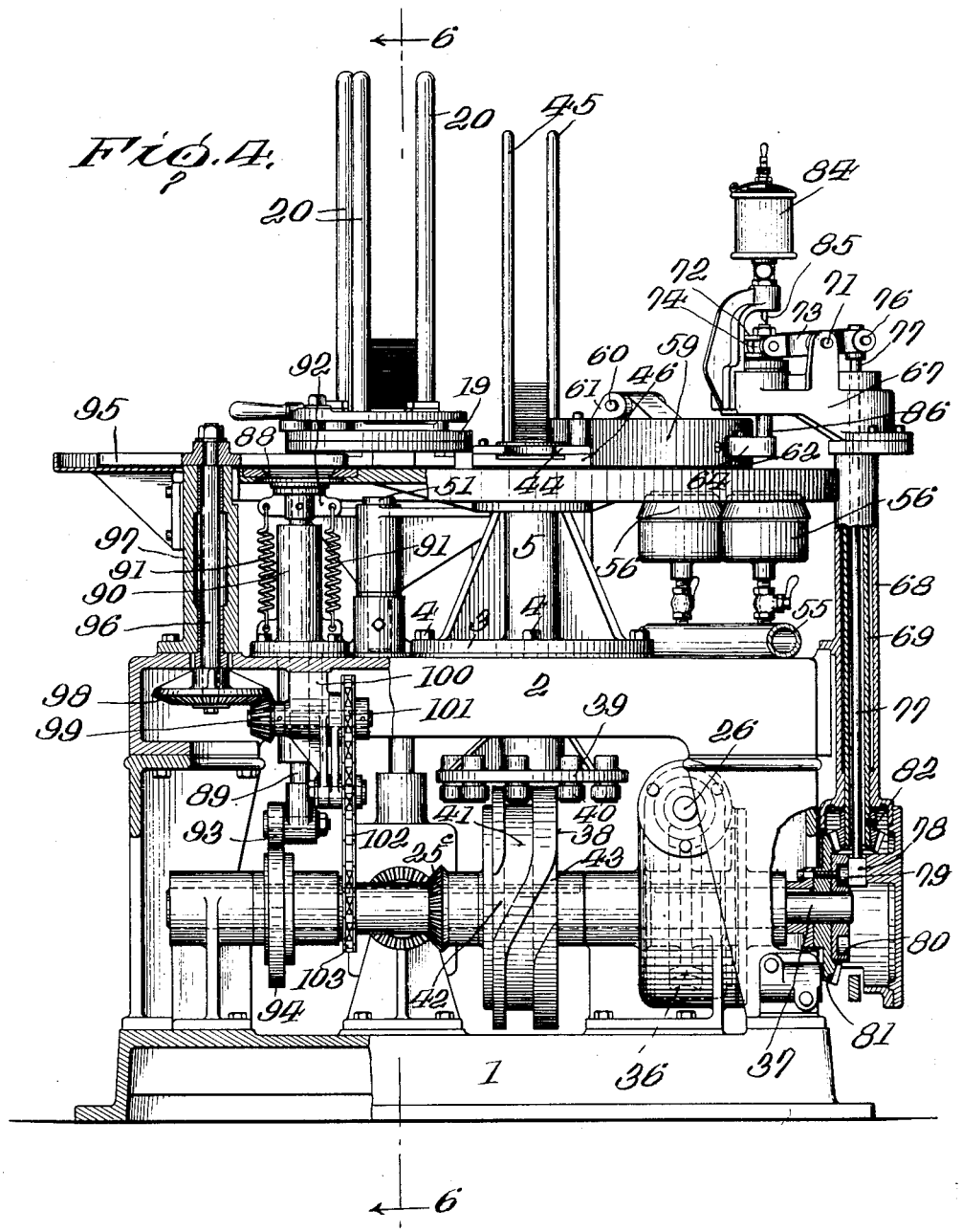

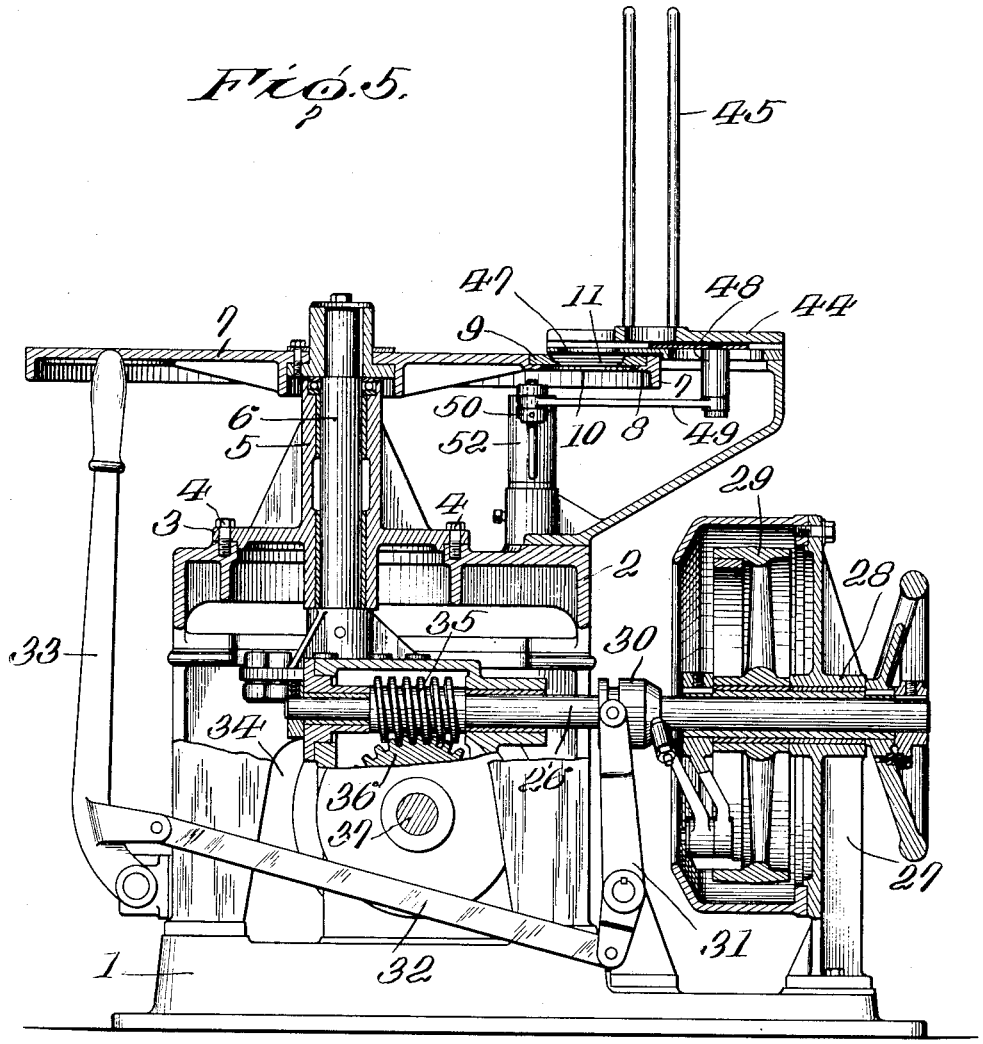

Oct. 13, 1936. A. L. KRONQUEST 2,057,037
MACHINE FOR APPLYING GLASS PANELS TO CAN ENDS
Filed June 22, 1935 5 Sheets-Sheet 4
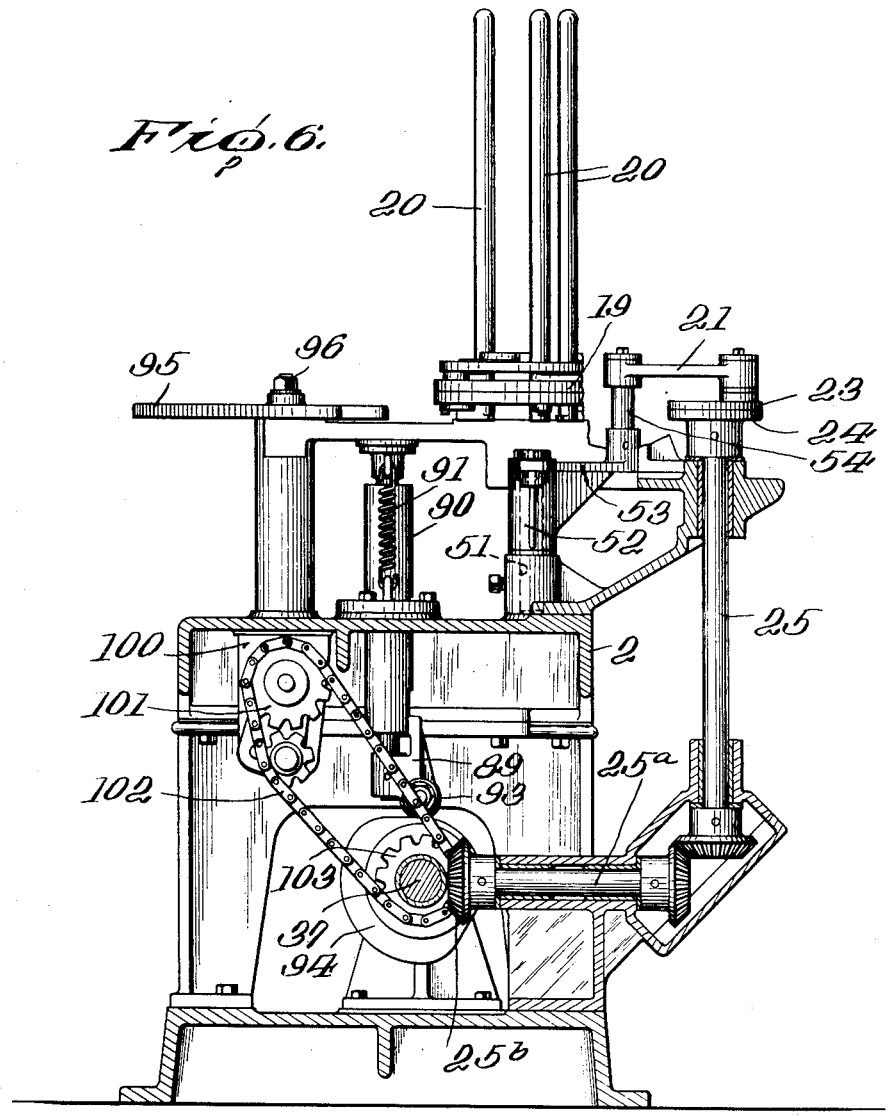
INVENTOR.
Alfred L. Kronquest
BY Mason & Porter
ATTORNEYS Oct. 13, 1936.  A. L. KRONQUEST  2,057,037
MACHINE FOR APPLYING GLASS PANELS TO CAN ENDS
Filed June 22, 1935  5 Sheets-Sheet 5
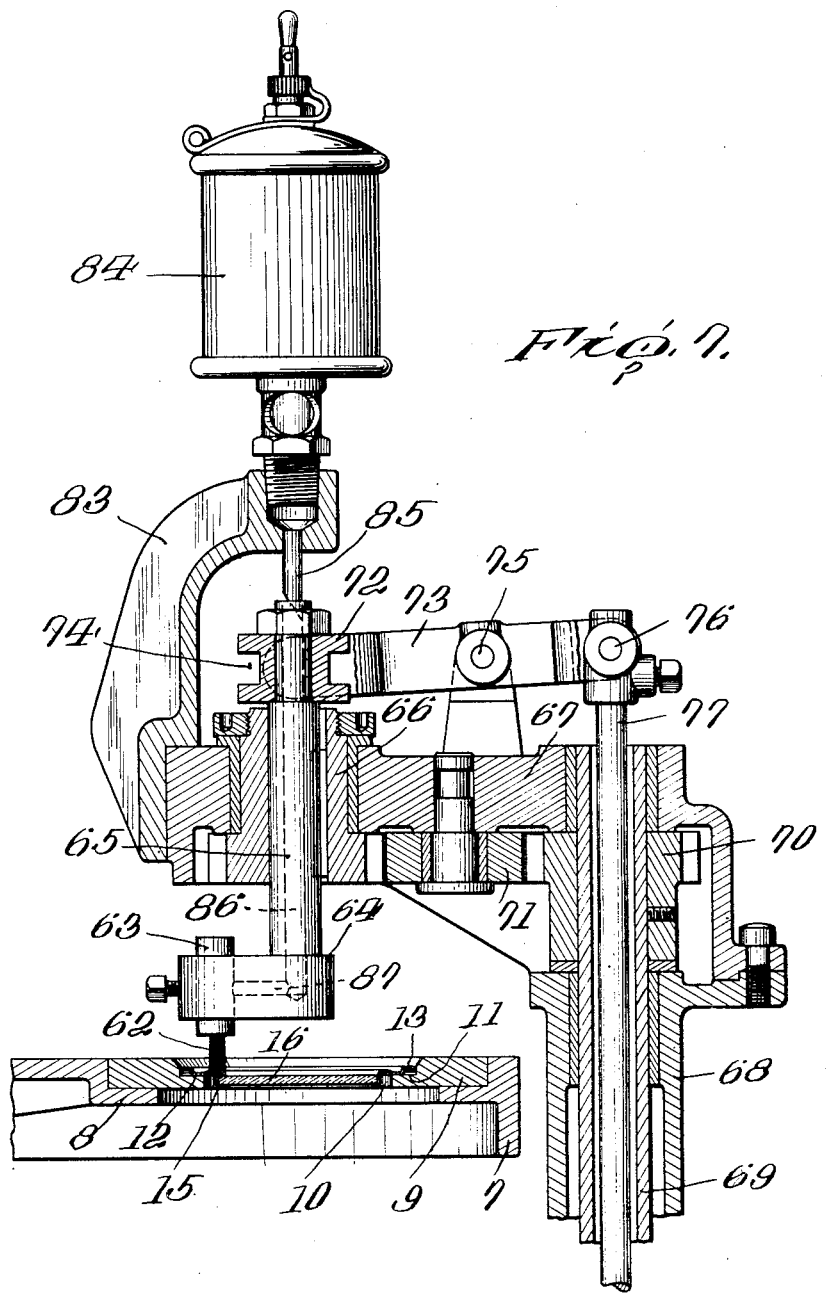

Patented Oct. 13, 1936

2,057,037

UNITED STATES PATENT OFFICE 2,057,037

MACHINE FOR APPLYING GLASS PANELS TO CAN ENDS

Alfred L. Kronquest, Syracuse, N. Y., assignor to Continental Can Company, Inc., New York, N. Y., a corporation of New York Application June 22, 1935, Serial No. 27,978

10 Claims. (Cl. 113—59)

The invention relates to new and useful improvements in a machine for applying a glass panel to a can end. It has been found expedient to deposit a metal rim on a glass panel and to subsequently apply a glass panel to a seat on a can end and solder bond the glass panel to the can end so as to provide an hermetically sealed metal bond between the glass panel and the can end.

An object of the invention is to provide a machine which may be used for assembling glass panels having metal rims applied thereto and can ends preparatory to the fluxing and solder bonding of the glass panel to the can end.

A further object of the invention is to provide a machine of the above type which includes a series of heating units and a conveyor which presents the assembled glass panel and can end in succession to the heating units.

A still further object of the invention is to provide a machine of the above type with means for automatically applying flux to the metal parts which are to be solder bonded while said parts are assembled on the conveyor.

A still further object of the invention is to provide a machine of the above type wherein the assembled glass panel and can end are rendered readily accessible to the operator for applying a solder bond to the parts which are to be joined.

These and other objects will in part be obvious and will in part be hereinafter more fully disclosed.

In the drawings which show by way of illustration one embodiment of the invention—

Figure 1 is a plan view of the machine embodying the improvements;

Fig. 2 is a sectional view of a glass panel with a metal can end attached thereto preparatory to the joining of the glass panel to the can end;

Fig. 3 is a view in section showing a metal can end provided with a seat ready to receive the glass panel;

Fig. 4 is a view partly in side elevation and partly in section of the machine shown in Fig. 1;

Fig. 5 is a view partly in side elevation and partly in section, the view being taken at right angles to that shown in Fig. 4, and certain of the parts being omitted for the sake of clearness;

Fig. 6 is a sectional view on the line 6—6 of Fig. 4, and

Fig. 7 is a vertical sectional view through a flux applying mechanism and also through the turret and can end holder, with the can end and glass panel in position for fluxing.

The invention has to do with a machine for assembling a can end and a glass panel preparatory to the solder bonding of the glass panel to the can end. The can end is of the usual construction, except that it has a relatively large opening centrally thereof, and the edge of the end about said opening is shaped so as to provide a seat for the glass panel. The glass panel is provided with a metal rim which is deposited thereon so as to form an integral part of the glass panel. The machine for assembling the glass panels and can ends includes a rotating turret which is provided with a series of holders shaped so as to support a can end at the peripheral portion thereof, leaving the central portion exposed from beneath. This turret is rotated intermittently so as to present a holder to a station where a can end is delivered from a stack holder into the holder of the turret. The turret then rotates through one step of its movement and presents the holder with a can end therein to the station where the glass panel is released from the stack and placed in the can end on the holder. There are a series of heating units beneath the turret, and these units are spaced the distance between the holders so that the turret may be stopped with the holder first over one heating unit and then another. Associated with the first heating unit is a hood for aiding in the heating of the metal parts and also the glass panel preparatory to the applying of solder thereto. At the next heating unit station, a flux is applied to the parts which are to be solder bonded. At the next heating unit station, and the one following, the can end with the glass panel is rendered accessible to the operator so that a solder bond may be applied to the heated parts and thus the glass panel bonded to the can end. As the turret continues its rotation, the bonded parts are cooled, and then the container with the panel attached is lifted from the holder and discharged from the machine.

Referring more in detail to the drawings, the machine illustrating the invention consists of a supporting base 1 on which is mounted a housing 2. Attached to this housing 2 is a bracket 3. Said bracket is secured to the housing by suitable bolts 4, 4. The bracket 3 is provided with a bearing sleeve 5 in which is mounted a vertical shaft 6. The shaft 6 carries a turret 7.

The turret 7 is provided with a series of holders all of which are similar in construction, and the description of one will answer for the others. The turret has an opening therethrough, and surrounding said opening is a ledge 8. Mounted on this ledge 8 is a holder ring 9. The holder ring 9 has an opening 10 therethrough, and surrounding the opening 10 is a seat 11 for the can end which is indicated at 12 in the drawings.

The can end 12, as shown in Fig. 3, is provided with the usual peripheral channel portion 13, the outer edge of which is curled as indicated at 14 to aid in the forming of a double seam when the can end is attached to the container body. This can end is also provided with a seat 15. The glass panel which is to be attached to the can end as indicated in Fig. 2, consists of a glass portion 16 having a metal rim 17 attached thereto. This metal rim is deposited on the glass so that it becomes an integral part thereof. The manner of attaching this metal rim to the glass panel forms no part of the present invention. The glass panel with the rim attached is placed on the seat 15, and the purpose of the invention is to assemble the glass panels and the can ends, then heat the metal parts, apply flux and a solder bond for joining the glass panel to the can end.

The can end is first placed on the seat 11 of the holder ring. The can ends are stacked in a stack holder which is shown in Figures 1, 4, and 6. The stack holder includes a bracket 18 carrying a base plate 19, and mounted on this base plate are three stack holder forming rods 20, 20. These rods are mounted so that they may be adjusted for can ends of different sizes. The can ends are released one at a time from the stack holder by means of an oscillating ring which is operated by a link 21 attached to a crank 22 fixed to a disk 23. This disk 23 is adjustably connected to a disk 24 at the upper end of a shaft 25. As this shaft rotates, the ring carrying the releasing fingers will be oscillated so as to release one can end at a time. This stack holder for the ends and the releasing means forms no part of the present invention, but is similar to that shown and described in the patent granted George Flook, June 21, 1932, No. 1,864,422.

The moving parts of the machine are operated from a main actuating shaft 26. Attached to the base of the machine is a supporting bracket 27 carrying a sleeve 28 through which this main actuating shaft extends. Mounted on the actuating shaft is a belt wheel 29. This belt wheel is adapted to be connected to the main actuating shaft by means of a clutch operated by a shiftable cone 30. The cone 30 is shifted for connecting the belt wheel to the shaft by means of a lever 31 to which is connected a link 32, and this link in turn is connected to a hand lever 33. The main actuating shaft 26 also rotates in a bearing carried by a bracket 34. Mounted on this main actuating shaft is a spiral worm 35 which meshes with a worm wheel 36 fixed to a cross shaft 37. This cross shaft 37 carries a cam drum 38 which rotates the turret intermittently. The turret shaft has attached thereto a disk 39 carrying a series of rollers 40. The cam drum has a groove 41 formed therein which is extended laterally and opens at one side of the cam drum as indicated at 42. The groove extends all the way around the cam drum and opens at the other side as indicated at 43.

As clearly shown in Fig. 4, the cam groove on the drum is of a width so as to receive one of the rollers. The roller passes along the cam groove and out through one of the lateral offsets of the cam groove. At the same time, another roller enters the opposite offset in the cam groove, and this is what causes the disk which is attached to the turret to rotate intermittently. The disk stops when the holder for the can end is directly beneath the stack, and therefore, when the can end is released from the stack holder it will drop into the holder on the turret. On the next intermittent rotation of the turret, the holder in which the can end has been deposited will be brought to the station where the glass panel is placed in the can end. The glass panels are all stacked in the stack holder consisting of a base plate 44 (see Fig. 5), to which is attached rods 45 in which the panels are stacked. These panels pass down through the opening in the base plate 44 and normally rest on a plate 46. The plate 46 is located beneath the base plate 44 the thickness of a glass panel. This plate extends laterally from the stack and has an opening 47 therethrough slightly larger than the panel. The side walls of the opening are tapered. A feed slide 48 moves back and forth beneath the base plate 44 and will feed the lowermost glass panel from beneath the stack over the opening 47 and it will drop through the opening 47 on to the seat 15 of the can end. This tapered opening 47 aids in the centering of the panel over the can end so that it will drop on to this seat.

The feed slide 48 is moved back and forth by means of a link 49 attached to an arm 50 mounted for oscillation on a fixed shaft 51. The arm 50 is fixed to a sleeve 52 which is mounted on this fixed shaft. There is a second arm 53 carried by the sleeve 52, and this second arm 53 is connected to the lower end of a pin 54 which extends up through the oscillating cover feed ring, and the upper end of this pin is connected to the link 21. The fixed shaft 51 has its axis in alinement with the axis of oscillation of the cover feed ring so that both the cover feed ring and the sleeve 52 can be oscillated from the same pin 54. Thus it is that the shaft 25, when it rotates, will operate the cover releasing ring and will also operate in synchronism therewith the feed slide for the glass panels. When a cover is being fed to one holder on the turret, a glass panel is being fed over and placed in the can end on the holder in advance thereof.

The shaft 25 which operates the can end releasing means and the panel releasing means is in turn operated from a shaft 25a through a beveled gear connection shown in Fig. 6. The shaft 25a carries a bevel gear 25b which meshes with a bevel gear 25c carried by the shaft 37. This gear 25c is omitted from the drawings in Fig. 6.

After the glass panel has been placed in the can end, then the assembled panel and end are moved with the turret so that they are placed in succession over a series of heating units. Mounted on the upper side of the housing 2 is a pipe 55. Attached to this pipe 55 is a series of heating units 56, 56. The pipe 55, as shown in Fig. 1, is connected to a gas supply pipe 57 with which is associated an air supply pipe 58. This provides a proper fuel mixture which is conducted along the pipe 55 and is supplied to each of these heating units 56. The heating units are, therefore, in the form of gas burners, and each heating unit has a regulating valve so that the amount of gas supplied thereto may be regulated.

As shown in the drawings, there are four heating units. The first heating unit at which the turret stops is covered by a hood 59. This hood is hinged at 60 to a supporting bracket 61 so that the hood is free from contact with the turret. The hood 60 has an extension leading to the stack of glass panels and some of the heat from the burner will be conveyed by the hood to the glass panels so as to preheat the panel before it is assembled on the can end. As noted above, the holder for the can end is so shaped that the can end and panel are exposed at the under side of the holder, and therefore, when the holder moves over the burner heat will be directly applied to the can end and the glass panel and both the end and the panel will be uniformly heated throughout so as to prevent the fracturing of the glass. These glass panels are of a character which will withstand heat without fracturing, providing the heat is evenly applied thereto.

At the next intermittent movement of the turret 7, the holder is brought over the next heating unit and beneath a flux applying device. This flux applying device is shown in detail in Fig. 7. Said flux applying device consists of a pad or brush 62 carried by a sleeve 63 mounted at the outer end of an arm 64 attached to the lower end of a shaft 65. This shaft 65 is keyed to a sleeve shaft 66 mounted for rotation in a supporting bracket 67 which is clamped to a standard 68. This standard 68 is secured to the main housing 1 of the machine. Extending up through the housing and into the bracket 67 is a sleeve shaft 69. Mounted on this sleeve shaft 69 is a gear wheel 70 which meshes with a gear wheel 71, and the gear wheel 71 in turn meshes with a gear carried by the sleeve shaft 66. When the shaft 69 is rotated, it will, through the gears 70 and 71 impart rotations to the sleeve shaft 66 and this will rotate the shaft 65 which is splined thereto.

Attached to this shaft 65 is a collar 72. The lever 73 is forked at its inner end and carries pins running in a groove 74 formed in the collar 72. This lever is pivoted at 75 to a fulcrum member carried by the bracket 67. At its outer end, the lever 73 is pivoted at 76 to a rod 77. This rod 77 extends down through the hollow shaft 69 and carries a block 78 at its lower end which is provided with a roller 79 adapted to run in a cam groove 80 in a disk attached to the shaft 37. This shaft 37 also carries a bevel gear 81 which meshes with a bevel gear 82 carried by the hollow sleeve shaft 69. As this shaft 37 rotates, it not only rotates the shaft 65 and causes the flux applying brush to move all the way around the can end, but it also oscillates the lever 73 and raises and lowers this shaft 65, and thus moves the brush first down into contact with the metal parts and then causes the brush to travel all the way around the metal parts, applying flux to the portions of the end and the rim of the glass panel which are to be solder bonded together. This brush may be rotated more than once until the parts are properly supplied with flux. This occurs while the turret is standing still and while the roller 40 is running in the cam groove 41, from substantially one end thereof to the other, that is, during 320° rotation of the shaft 37. Attached to this bracket 67 is an arm 83 on which is mounted a receptacle 84 supplied with flux. Extending from this receptacle 84 is a tube 85. There is a passage 86 centrally through the shaft 65 and terminating in the arm 64. There is a passage 87 extending radially out through the arm and communicating with this passage 86. Thus it is that flux from the receptacle 84 is gradually fed through the passages to the brush 62.

On the next intermittent rotation of the turret, the holder is positioned over the burner indicated at 56a in Fig. 1 of the drawings. The turret then comes to a standstill and remains in this position while the shaft 37 is making another 320° rotation. The turret is then given another intermittent motion so as to bring the holder directly over the burner indicated at 56b. It will be noted that there are no obstructions above the can end and glass panel when they are positioned over these burners 56a and 56b, and it is at one or the other of these heating units that the operator applies a stick of soft solder to the heated parts of the cam end and causes said stick of soft solder to move all the way around the end one or more times until the entire space between the metal rim of the glass panel and the wall of the seat is filled with solder. Thus it is that the glass panel is solder bonded to the can end with a metal seal which is hermetic.

The turret is then moved to bring the can end away from the heating units so as to allow the solder to cool, and during the cooling of the solder, any suitable means may be used for aiding in conducting the heat away from the can end, if desired. This finally brings the holder to the position where the can end with the attached glass panel is to be discharged from the turret. Located directly beneath the turret at the discharging station is an ejector pad 88. This ejector pad 88 is carried at the upper end of a rod 89 which reciprocates in a sleeve bracket 90 bolted to the upper plate of the main housing 1. Coiled springs 91 are attached to a cross bar 92 connected to the ejector bar and also to the frame of the machine, and these springs normally operate to depress the ejector pad beneath the plane of travel of the turret. Attached to the lower end of the ejector rod 89 is a roll 93. This roll 93 contacts with a cam 94 carried by the shaft 37. This cam 94, as shown in Fig. 6, is so constructed that it will operate to lift the ejector pad when the turret comes to a standstill with the holder directly above the pad. The pad moves up through the opening in the holder and lifts the can end with the attached glass panel to a position above the upper face of the turret.

Ejector fingers 95 are mounted at the upper end of a shaft 96, which shaft is journaled in a sleeve bearing 97 carried by the main housing 1. At the lower end of this shaft 96 is a bevel gear 98 which meshes with a bevel gear 99 carried by a short shaft which is journaled in a bracket 100 attached to the under face of the upper plate of the main housing. On the other end of the shaft carrying the bevel gear 99 is a sprocket wheel 101 and a sprocket chain 102 runs over this sprocket wheel 101 and also over a sprocket wheel 103 on the shaft 37. Thus it is that the shaft 37 rotates the shaft 96 and causes the ejector fingers 95 to sweep across the upper face of the turret and carry the can end off from the ejector pad along a guide rail 104 and finally discharges the same into a discharge chute 105 which is preferably inclined so as to guide the ends down into a stacking chute 106.

From the above it will be apparent that a machine has been provided wherein the can ends and glass panels are automatically fed from the supply so that they are assembled in the holders of the intermittently rotating turret. First the can end is placed in a holder and then a glass panel is placed in the positioned can end. After the end and the panel have been thus assembled on the holders, the holders are moved on the turret so as to position the end and panel over the first heating unit, then over the next heating unit, where flux is applied, and then in turn over the next two heating units where the operator may apply the soft solder for the bonding of the parts together. After the solder is applied, then the turret is moved so as to position the end with the attached panel at two idle stations for cooling, and then to the final station for discharge. At this final station, the end is raised from the holder to a position above the path of travel of the turret, and the ejector arm sweeping across the turret will move the end with the attached panel off from the pad and into the discharge chute.

While the heating units are shown in the form of gas burners, it is understood that other types of heating units may be utilized.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A machine for applying glass panels having metal rims formed integral therewith to can ends comprising a holder, a can end feed, a glass panel feed, a series of heating units, a flux applying means associated with one of said heating units, and means for presenting said holder intermittently and in succession to the can end feed to receive the can end, to the glass panel feed for positioning the glass panel in the end, to the flux applying means and to the heating units whereby the assembled can end and panel rim are heated and fluxed preparatory to applying the solder bond thereto for uniting the same.

2. A machine for applying glass panels having metal rims formed integral therewith to can ends comprising a can end feed, a glass panel feed, a series of heating units, a turret having a series of holders, means for rotating said turret for presenting said holders intermittently and in succession to the can end feed to receive a can end, to the glass panel feed for the positioning of a glass panel in the end on the holder, and for positioning the holders over said heating units, and a flux applying device associated with one of said heating units for applying flux to the can end and the metal rim of the panel preparatory to applying the solder bond thereto for uniting the same.

3. A machine for applying glass panels having metal rims formed integral therewith to can ends comprising a can end feed, a glass panel feed, a series of heating units, a flux applying means associated with one of said heating units, a turret having a series of holders provided with seats adapted to receive the can ends, each holder being constructed so that the central portion of the can end is exposed from beneath, and means for rotating said turret intermittently for presenting said holders in succession beneath the can end feed and beneath the glass panel feed, whereby a glass panel is positioned on a can end, and for passing said holders in succession over said heating units whereby the assembled can end and panel rim are fluxed and heated preparatory to applying the solder bond thereto for uniting the same.

4. A machine for applying glass panels having metal rims formed integral therewith to can ends comprising a can end feed, a glass panel feed, a series of heating units, a flux applying means associated with one of said heating units, a turret having a series of holders provided with seats adapted to receive the can ends, each holder being constructed so that the central portion of the can end is exposed from beneath, means for rotating said turret intermittently for presenting said holders in succession beneath the can end feed and beneath the glass panel feed whereby a glass panel is positioned on a can end, and for passing said holders in succession over said heating units whereby the assembled can end and panel rim are fluxed and heated preparatory to applying the solder bond thereto for uniting the same, means for lifting the can end and attached panel from the seat in the holder, and means for discharging the lifted can end from the turret.

5. A machine for applying glass panels having metal rims formed integral therewith to can ends comprising a can end feed, a glass panel feed, a series of heating units, a flux applying means associated with one of said heating units, a turret having a series of holders provided with seats adapted to receive the can ends, each holder being constructed so that the central portion of the can end is exposed from beneath, means for rotating said turret intermittently for presenting said holders in succession beneath the can end feed and beneath the glass panel feed whereby a glass panel is positioned on a can end, and for passing said holders in succession over said heating units whereby the assembled can end and panel rim are fluxed and heated preparatory to applying the solder bond thereto for uniting the same, an ejector pad disposed beneath said turret, means for raising the ejector pad through the holder for lifting the can end and attached panel above the holder, and means for discharging the can end from the ejector pad while in raised position.

6. A machine for applying glass panels having metal rims formed integral therewith to can ends comprising a can end feed, a glass panel feed, a series of heating units, a flux applying means associated with one of said heating units, a turret having a series of holders provided with seats adapted to receive the can ends, each holder being constructed so that the central portion of the can end is exposed from beneath, means for rotating said turret intermittently for presenting said holders in succession beneath the can end feed and beneath the glass panel feed whereby a glass panel is positioned on a can end and for passing said holders in succession over said heating units whereby the assembled can end and panel rim are fluxed and heated preparatory to applying the solder bond thereto for uniting the same, an ejector pad, a rod supporting the same, a cam for lifting said rod, springs for depressing the rod, said cam being shaped so as to lift the ejector pad through the holder for raising the can end and attached panel above the holder when said turret is at rest, and means for discharging the can end from the raised ejector pad.

7. A machine for applying glass panels having metal rims formed integral therewith to can ends comprising a can end feed having means for releasing one can end at a time, a glass panel feed having means for discharging one panel at a time, a series of heating units, a rotating turret having a series of holders, each of which is provided with a seat adapted to support a can end at the peripheral edge thereof, means for rotating said turret intermittently for presenting the holders in succession to the can end feed and the panel feed, said rotating means being timed with the can end feed and panel feed so that the holder remains stationary while the can end is placed therein, and said holder remains stationary while the glass panel is positioned in said can end, said glass panel feeding means having a tapered centering ring for centering the glass panel over the seat on the can end.

8. A machine for applying glass panels having metal rims formed integral therewith to can ends comprising a series of heating units, a fluxing means associated with one of said units, a turret having a series of holders adapted to support a can end with a glass panel positioned thereon, means for intermittently rotating said turret for presenting the holders in succession to the flux applying means and to the heating units whereby the assembled can end and panel rim are fluxed and heated preparatory to the applying of the solder bond thereto for uniting the same.

9. A machine for applying glass panels having metal rims formed integral therewith to can ends comprising a series of heating units, a fluxing means associated with one of said units, a turret having a series of holders adapted to support a can end with a glass panel positioned thereon, means for intermittently rotating said turret for presenting the holders in succession to the flux applying means and to the heating units whereby the assembled can end and panel rim are fluxed and heated preparatory to the applying of the solder bond thereto for uniting the same, an ejector pad associated with said turret, means for operating said ejector pad in timing with the movements of the turret whereby it is moved through a holder for raising the can end and attached panel above the turret, and means for discharging a can end from the raised ejector pad.

10. A machine for applying glass panels having metal rims formed integral therewith to can ends comprising a series of heating units, a fluxing means associated with one of said units, a turret having a series of holders adapted to support a can end with a glass panel positioned thereon, means for intermittently rotating said turret for presenting the holders in succession to the flux applying means and to the heating units whereby the assembled can end and panel rim are fluxed and heated preparatory to the applying of the solder bond thereto for uniting the same, said flux applying means including a shaft disposed centrally of the heating unit, an arm carried by said shaft, a flux applying brush carried by said arm, means for applying flux to said brush, means for moving said shaft endwise, and means for rotating said shaft, said endwise moving means being timed so as to position said brush in contact with the can end and glass panel rim for fluxing the same while the turret is at rest.

ALFRED L. KRONQUEST.